United States Patent [19]

Raidel

[11] Patent Number: 4,756,550

[45] Date of Patent: Jul. 12, 1988

[54] SUSPENSION ASSEMBLY WITH COMPOUND PARALLELOGRAM

[76] Inventor: John E. Raidel, Rte. 1, Box 400-M, Springfield, Mo. 65804

[21] Appl. No.: 7,328

[22] Filed: Jan. 27, 1987

[51] Int. Cl.[4] .............................................. B60G 11/26
[52] U.S. Cl. ..................... 280/713; 280/676; 280/683
[58] Field of Search ............... 280/711, 713, 676, 683

[56] References Cited

U.S. PATENT DOCUMENTS

| | | | |
|---|---|---|---|
| 3,147,024 | 9/1964 | Brockman | 280/683 |
| 3,406,983 | 10/1968 | Masser | 280/713 |
| 3,510,149 | 5/1970 | Raidel | 280/712 |
| 4,114,923 | 9/1978 | Raidel | 280/711 |
| 4,132,432 | 1/1979 | Raidel | 280/711 |

*Primary Examiner*—Kenneth R. Rice

*Attorney, Agent, or Firm*—Rogers, Howell, Moore & Haferkamp

[57] ABSTRACT

A vehicle suspension assembly for tandem drive axles has a suspension system for each axle. Each suspension system incorporates two lower torque beams on each side of the vehicle and a single central upper torque rod. A central hanger is mounted between the two axles. The lower torque beams are pivotally connected between the hanger and an axle seat. A straddle bracket connects the axle to the axle seat in a hinged fashion. The upper central torque rod is connected between the upper side of the axle housing and the chassis. The lower torque beams act as a parallelogram to stabilize the axle seat. They also act together with a portion of the axle seat as a composite lower torque rod cooperating with the upper torque rod to stabilize the axle.

7 Claims, 2 Drawing Sheets

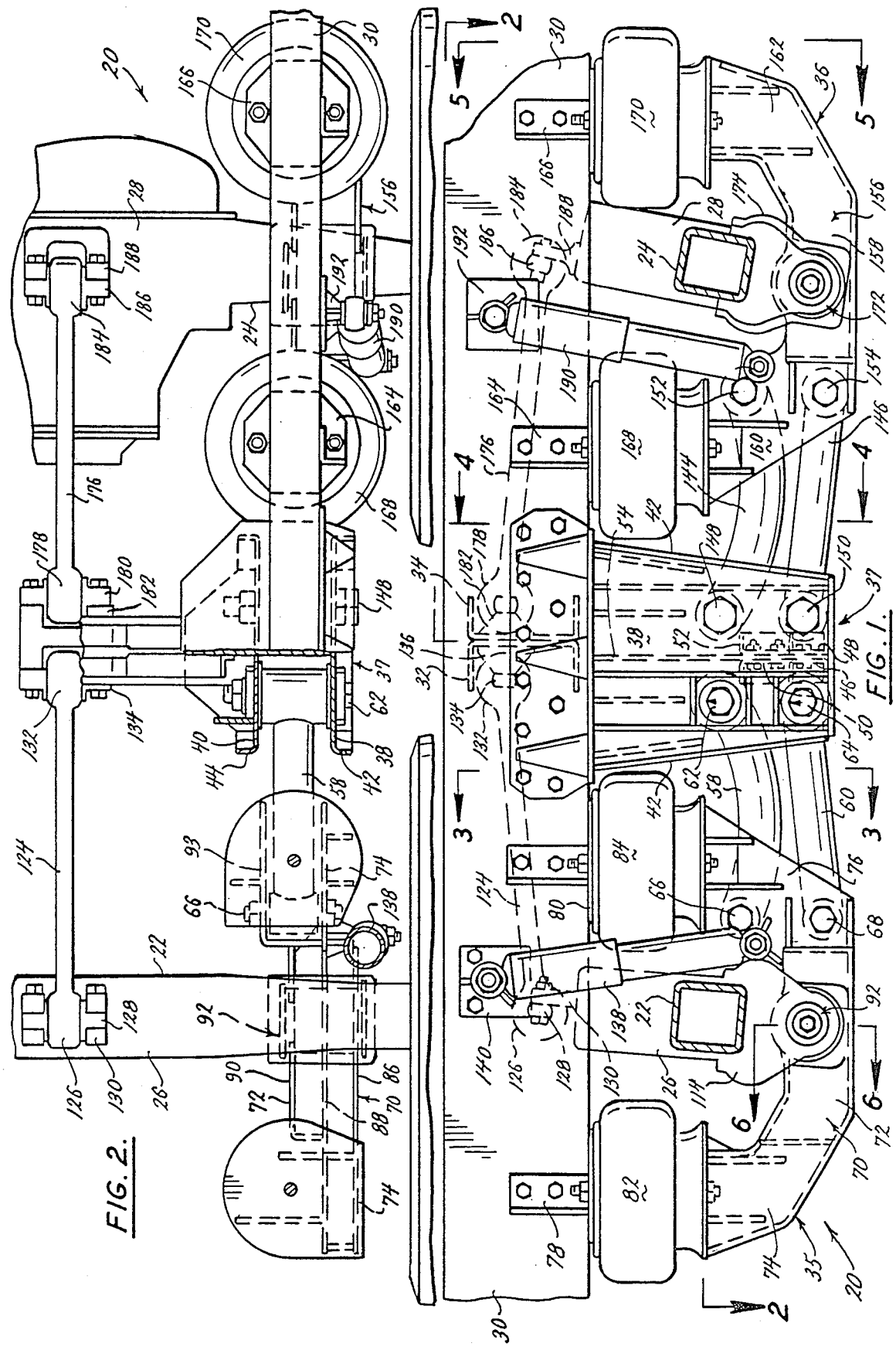

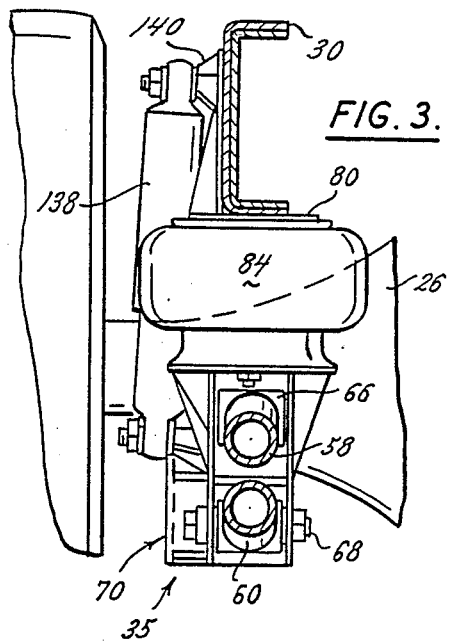
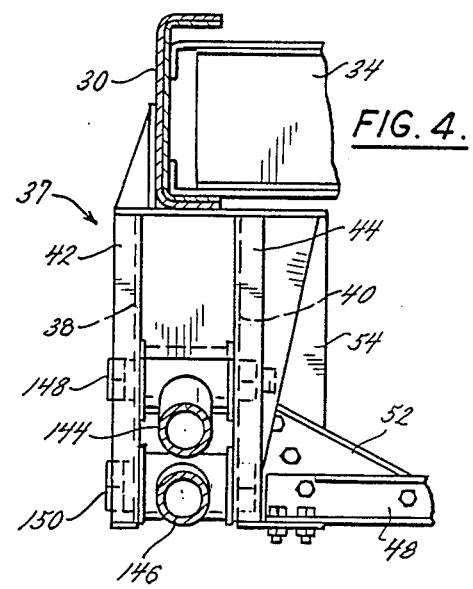
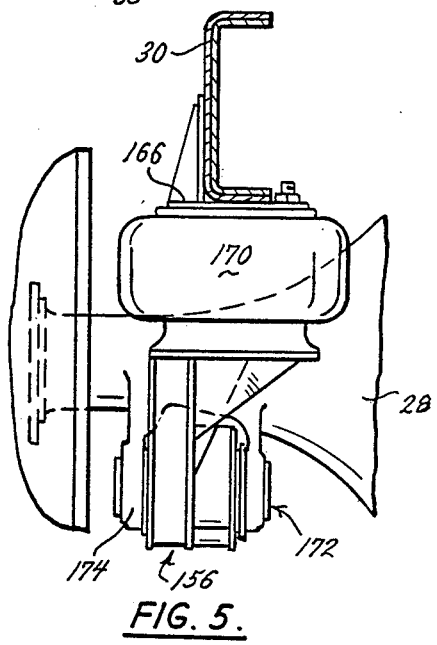
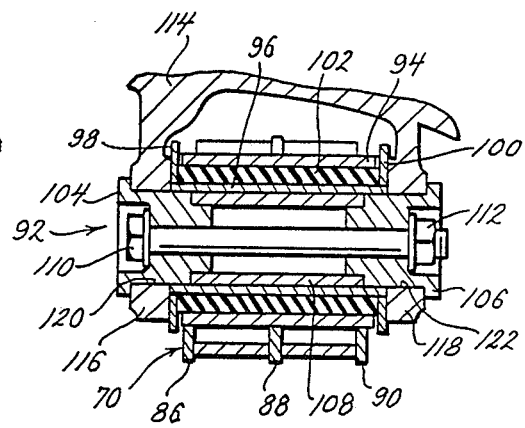

SUSPENSION ASSEMBLY WITH COMPOUND PARALLELOGRAM

BACKGROUND OF THE INVENTION

This invention relates to a suspension assembly having a compound parallelogram arrangement to stabilize an axle seat and an axle hinged together. The invention incorporates a central hanger between tandem axles, two air springs forward and rearward of each axle, and a central upper torque rod that is part of the parallelogram system for both sides of the vehicle, each side having its own parallelogram to stabilize the axle seat.

Various suspension systems heretofore developed have incorporated a parallelogram arrangement or have incorporated a centrally mounted upper torque rod. Some of these suspension systems have incorporated two air springs forward and rearward of an axle. For example, U.S. Pat. No. 4,114,923 issued to John E. Raidel is an example of such a suspension system. U.S. Pat. No. 4,132,432, also issued to John E. Raidel, shows different forms of parallelogram arrangements. U.S. Pat. No. 4,181,323 issued to Raidel shows a central hanger arrangement between tandem axles with two air springs forward and rearward of each axle and with a parallelogram arrangement. None of these suspension systems has the axle seat hinged to an axle bracket with stabilization and control provided by the compound parallelogram arrangement of the present invention.

SUMMARY OF THE INVENTION

This suspension assembly is intended for installation with tandem drive axles. The suspension assembly incorporates four air springs per axle. A hanger assembly is centrally mounted between the axles and an axle seat assembly associated with each axle is connected to the hanger assembly by two pivotally mounted torque beams arranged in a parallelogram. The axle seat assembly is hinged to the axle by a straddle bracket. A central upper torque rod is connected between the upper side of the axle body and a chassis cross frame member. On each side of the vehicle, an air spring is mounted forward and rearward of each axle, connected between the axle seat and the chassis side rail.

The parallelogram arrangement of the lower torque beams maintains stabilization of the axle seat assembly. For the axle, these two lower torque beams cooperate with a portion of the axle seat to form a composite lower parallelogram arm. The upper parallelogram arm is provided by upper torque rod, the combination defining a parallelogram that controls and stabilizes the axle. This compound parallelogram arrangement allows for the hinging of the axle seat to the axle bracket with precise parallelogram controlled movement. The centralized third radius rod at the top of the axle housing defines the upper parallelogram arm for both sides of the vehicle and saves space.

BRIEF DESCRIPTION OF THE DRAWINGS

FIG. 1 is a side elevation view of the suspension assembly;

FIG. 2 is a top plan view of the suspension assembly as viewed along the plane of the line 2—2 of FIG. 1 and with parts broken away;

FIG. 3 is a view in section taken along the plane of the line 3—3 of FIG. 1;

FIG. 4 is a view in section taken along the plane of the line 4—4 of FIG. 1;

FIG. 5 is a view in section taken along the plane of the line 5—5 of FIG. 1; and FIG. 6 is an enlarged view in section taken along the plane of the line 6—6 of FIG. 1.

DETAILED DESCRIPTION OF PREFERRED EMBODIMENT

The suspension assembly 20 is adapted for use with a vehicle having forward and rearward tandem drive axles 22 and 24. The axles have central housings 26 and 28, respectively. The chassis includes a left longitudinal side rail 30, a similar right longitudinal right side rail (not shown) and back-to-back cross channel members 32 and 34 extending between the longitudinal side rails.

The suspension assembly 20 which will be described as depending from the left side rail 30 has an identical counterpart on the right side of the vehicle that need not be described. However, it will be understood that the left and right side assemblies are identical and cooperate with one another to provide the overall vehicle suspension.

The suspension assembly 20 includes a forward suspension system 35 associated with the front axle 22 and a rearward suspension system 36 associated with the rear axle 24. The suspension systems 35 and 36 are generally identical with identical components except they are the reverse of one another. Both suspension systems depend from a central hanger assembly 37 that depends downwardly from the side rail 30. The hanger assembly 37 includes opposed spaced plates 38 and 40 with suitable reinforcing peripheral flanges 42 and 44, respectively. A pair of cross channel members 46 and 48, with reinforcing gussets 50 and 52, are bolted to side plates 54 that in turn are welded to the hanger plate 40. The cross channel members 46 and 48 are similarly connected to a complementary hanger assembly like the hanger assembly 37 on the other side of the vehicle and thereby stiffen and reinforce the hanger assemblies.

A pair of torque beams 58 and 60 extend forwardly of the hanger assembly 37. The torque beams 58 and 60 have rearward ends that are journalled on eccentric bolt and bushing assemblies 62 and 64, respectively, of a design that is known in the art (see U.S. Pat. No. 3,510,149). The forward ends of the torque beams 58 and 60 are connected to bushing assemblies 66 and 68 that are supported by an axle seat assembly 70. The torque beams 58 and 60 define a parallelogram with the pivotal connectors to the hanger assembly 37 and the axle seat assembly 70.

The axle seat 70 includes a generally longitudinal central section 72 that is positioned below the axle 22 and includes forward and rearward upwardly extending pedestal sections 74 and 76. A spring seat 78 is connected to the side rail 30 in a position above the forward pedestal section 74 and a spring seat 80 is connected to the side rail 30 above the rear pedestal section 76. An air spring 82 is connected between the forward pedestal section 74 and the spring seat 78, and an air spring 84 is connected between the rear pedestal section 76 and the spring seat 80.

The longitudinal central section 72 of the axle seat assembly 70 is formed with three vertical plates 86, 88 and 90 to support a bushing assembly 92. The upwardly extending pedestal section 74 is generally formed with the two vertical plates 88 and 86 to support the air spring 82. The pedestal section 76 is generally formed with the vertical plate 88 and a bent vertical plate 93. As thus formed, this pedestal section 76 supports the air spring 84 and supports the bushing assemblies 66 and 68.

The bushing assembly 92 includes an outer sleeve 94 supported within holes in the plates 86, 88 and 90 and a spaced inner sleeve 96, and bearing washers 98 and 100. An elastomeric bushing 102 is located between the outer and inner sleeves 94 and 96 and between the washers 124 and 126.

A bushing retainer includes hubs 104 and 106 on opposite ends of a cylindrical sleeve 108 held in place by a bolt 110 and nut 112. A straddle bracket 114 has sides 116 and 118 with holes 120 and 122, respectively, through them that allow the sides 116 and 118 to be mounted on the hubs 104 and 106, positioned against the ends of the inner sleeve 96 and the washers 98 and 100. When the nut 112 is tightened on the bolt 110, the side walls 116 and 118 are pressed tightly against the ends of the sleeve 96 so that the parts will move together. The straddle bracket 114 is welded to the axle 22 and thus provides a hinge connection between the axle 22 and the axle seat assembly 70.

Preferably at the center of the chassis, an upper torque rod 124 is located. The forward end 126 of the torque rod is mounted on a pin or bolt 128 that is supported in a bracket 130, and the bracket 130 is welded to the top of the axle housing 26. The rearward end 132 of the upper torque rod is journalled on a bolt or pin 134 that is supported in a bracket 136 that is bolted to the cross channel member 32. The length of the upper torque rod 124 is substantially the same as the span between the axis of the bushing assembly 92 and the plane of the axes of the eccentric bolt and bushing assemblies 62 and 64.

A shock absorber 138 is mounted between an upper bracket 140 that is bolted to the side rail 30 and the axle seat assembly 70.

Referring to the rear suspension system 36, it includes a pair of torque beams 144 and 146. The forward ends of the torque beams 144 and 146 are connected to bushing assemblies 148 and 150, respectively. The rear suspension system on the other side of the vehicle corresponding to the suspension system 36 has eccentric bolt and bushing assemblies like the assemblies 62 and 64. Therefore, the eccentric bolts are omitted in the bushing assemblies 148 and 150. The bushing assemblies 148 and 150 are supported by the hanger assembly 37.

The rear ends of the torque beams 144 and 146 are journalled on bushing assemblies 152 and 154, respectively. The bushing assemblies 152 and 154 are supported by an axle seat assembly 156 that, like the axle seat assembly 70, has a central longitudinal section 158, a forward upwardly extending pedestal section 160, and a rearward upwardly extending pedestal section 162. Spring seats 164 and 166 are bolted to the side rail 30 in positions above the pedestal sections 160 and 162, respectively, and an air spring 168 is connected between the pedestal section 160 and the spring seat 164 while an air spring 170 is connected between the pedestal section 162 and the spring seat 166.

A bushing assembly 172 is supported by the axle seat assembly 156. The bushing assembly 172 is identical to the bushing assembly 92 already described and illustrated in FIG. 6. The bushing assembly supports a straddle bracket 174 in the manner the straddle bracket 114 is supported by the bushing assembly 92. The straddle bracket 174 is welded to the axle 24.

An upper torque rod 176 is generally aligned with the upper torque rod 124. The forward end 178 of the upper torque rod 176 is journalled on a pin or bolt 180 that is mounted in a bracket 182 bolted to the cross channel member 34. The rearward end 184 of the upper torque rod 176 is journalled on a pin or bolt 186 that is supported by a bracket 188 welded to the upper side of the axle housing 28.

A shock absorber 190 is connected between a bracket 192 that is connected to the side rail 30 and the axle seat assembly 156.

OPERATION

This suspension assembly 20 provides eight air springs for tandem drive axles 22 and 24 to produce excellent ride qualities. The center mount provided by the centrally located hanger assembly 37, together with the design of the axle seat assemblies 70 and 156, make the suspension assembly very compact so that it can fit where space is limited. The hinged connection between the axles and the axle seat assemblies provides independent axle movement, but the compound parallelogram arrangement stabilizes the axle movement by stabilizing the axle seat and stabilizing the axle itself.

This stabilization is provided by the compound parallelogram arrangement, such as that of the suspension system 35. In this compound parallelogram arrangement, the lower torque beams 58 and 60 stabilize the axle seat assembly on the one hand and on the other hand, they act together along with a portion of the axle seat to provide a composite lower torque rod that cooperates with the upper torque rod 124 to form another parallelogram. The straddle bracket 114 that can rock about the bushing assembly 92 provides a hinge connection between the axle 22 and the axle seat assembly 70.

The torque beams 58 and 60 are of the same effective length even though the upper torque rod 58 is curved to provide space above it. Therefore, these torque beams 58 and 60 stabilize the axle seat assembly 70. In addition, a composite lower rod is defined by the axes of the eccentric bolt and bushing assemblies 62 and 64 and the axis of the bushing assembly 92. This somewhat articulated composite lower torque rod is of the same length as the upper torque rod 124 and the thus formed parallelogram stabilizes the axle 22.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. A suspension system for a vehicle having a frame and an axle comprising an axle seat assembly, an air spring connected between the axle seat assembly and the frame, an axle bracket rigidly connected to the axle, bushing means for pivotally supporting the axle bracket from the axle seat assembly to thereby hinge the axle to the axle seat assembly, a hanger depending from the frame, a pair of torque beams pivotally connected between the hanger and the axle seat assembly and defining a parallelogram for stabilizing the pitch of the axle seat assembly while also cooperating to define a lower composite torque rod extending between the hanger pivotal connections and the bushing means, and an upper torque rod spaced above the torque beams and pivotally connected between the frame and the axle bracket and defining a substantial parallelogram with the lower composite torque rod, whereby the resulting compound parallelogram stabilizes the pitch of the axle seat assembly relative to the frame and stabilizes the pitch of the axle bracket and therewith the axle relative to the frame.

2. The suspension system of claim 1 including a second air spring mounted between the axle seat assembly and the frame, the axle being between the air springs.

3. The suspension system of claim 1 wherein the axle is a rear axle and the vehicle has a forward axle and wherein the beam assembly is rearward of the hanger, and a second axle seat assembly forward of the hanger, a forward air spring connected between the second axle seat assembly and the forward axle, a frame bracket connected to the forward axle, forward bushing means for pivotally supporting the forward axle bracket from the forward axle seat assembly, a pair of forward torque beams pivotally connected between the hanger and the forward axle seat assembly and defining a parallelogram for stabilizing the pitch of the forward axle seat assembly while also cooperating to define a forward lower composite torque rod extending between the hanger pivotal connections of the forward torque beams and the forward bushing means, and a forward upper torque rod spaced above the forward torque beams and pivotally connected between the frame and the axle and defining a substantial parallelogram with the forward lower composite torque rod.

4. The suspension system of claim 3 including a third air spring mounted between the first-named axle seat assembly and the frame, the rear axle being between the first-named air spring and the third air spring, and a fourth air spring mounted between the forward axle seat assembly and the frame, the forward axle being between the forward air spring and the fourth air spring.

5. The suspension assembly of claim 1 wherein the torque beam connections to the hanger assembly include eccentric bolts for aligning the axle.

6. A suspension assembly for a vehicle that has a chassis including forward and rearward tandem axles comprising a central hanger depending downwardly from a side of the chassis at a location between the axles, a forward axle seat assembly, a rearward axle seat assembly, forward bracket means rigidly connected to the forward axle, means for pivotally connecting the forward bracket means to the forward axle seat assembly, rearward bracket means rigidly connected to the rearward axle, means for pivotally connecting the rearward bracket means to the rearward axle seat assembly, a pair of forward torque beams pivotally connected between the hanger assembly and the forward axle seat assembly and forming a parallelogram, a pair of rearward torque beams pivotally connected between the hanger assembly and the rearward axle seat assembly and forming a parallelogram, an upper forward torque rod pivotally connected between the forward bracket means and the chassis and forming a substantial parallelogram with the forward torque beams and forward axle seat assembly, and an upper rearward torque rod pivotally connected between the rearward bracket means and the chassis and forming a substantial parallelogram with the rearward torque beams and rearward axle seat assembly.

7. The suspension assembly of claim 6 combined with a similar suspension assembly on the opposite side of the vehicle wherein the torque rods are at the center of the vehicle and form portions of parallelograms on both sides of the vehicle.

* * * * *